(No Model.)

R. B. BERRIE.
PAVING BLOCK.

No. 400,997. Patented Apr. 9, 1889.

WITNESSES:
D. D. Mott
C. Sedgwick

INVENTOR:
R. B. Berrie
BY Munn & Co.
ATTORNEYS.

UNITED STATES PATENT OFFICE.

ROBERT B. BERRIE, OF LEXINGTON, MISSOURI.

PAVING-BLOCK.

SPECIFICATION forming part of Letters Patent No. 400,997, dated April 9, 1889.

Application filed September 21, 1888. Serial No. 285,967. (No model.)

*To all whom it may concern:*

Be it known that I, ROBERT B. BERRIE, of Lexington, in the county of La Fayette and State of Missouri, have invented a new and Improved Paving-Block, of which the following is a full, clear, and exact description.

My invention relates to an improvement in paving-blocks, and has for its object to provide a block of simple, durable, and economical construction.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1:
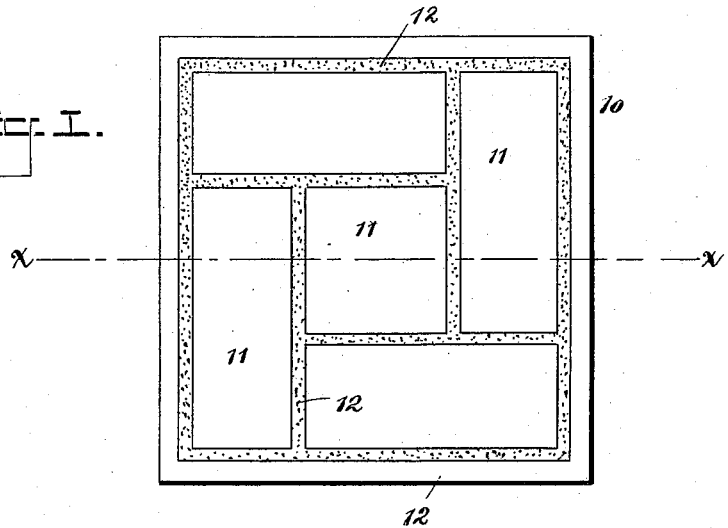
Figure 2:
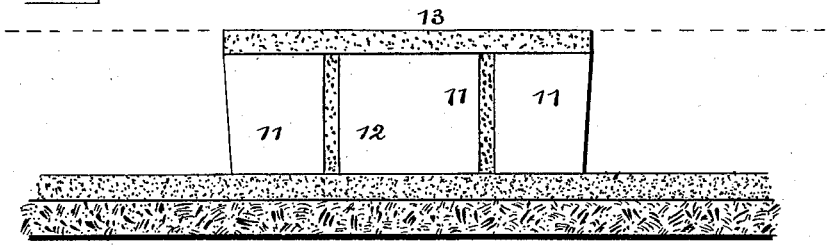

Figure 1 is a bottom plan view of the block within a mold, and Fig. 2 is a section on line x x of Fig. 1 through the block only.

In carrying out the invention the mold 10 is of any suitable contour—preferably rectangular—and within the mold a series of bricks, 11, well soaked with water, are arranged, forming a rectangle. The bricks are usually five in number, the outer ends of the outer bricks being preferably made tapering, and are wider at the top than at the bottom, as best shown in Fig. 2, and the said bricks are so located within the mold that one brick will be longitudinally parallel with each side of the mold, and the end of one contiguous brick will be also parallel with the said sides, as best illustrated in Fig. 1. A small square brick is placed in the center of the mold between the long bricks, and a space, 12, is made to intervene the several bricks and the several sides of the mold. The bricks having been placed in position within the mold, a thin grout, composed, preferably, of one part Portland cement, or its equivalent, and one part sand, is poured in the spaces intervening the contiguous sides of the bricks and the bricks and the sides of the mold. After this has been accomplished and the spaces 12 filled with the cement, the top of the bricks is covered with a layer of mortar, 13, as best illustrated in Fig. 2, which mortar is preferably of Portland cement and sand.

The mortar is troweled to a smooth finish in the mold and allowed to harden. After hardening, the block is removed from the mold and coated with coal-tar upon all sides with the exception of the top. The block is then ready for use.

By reason of the union of the several bricks as above described the blocks are of less width at the bottom than at the top. This shape is elected in order to prevent the blocks from being crowded up by the frost, thereby avoiding the danger of breaking the same. In laying my improved blocks it is not necessary to embed the same in cement, as they are heavy enough to be embedded in sand, like an ordinary paving-block.

The blocks being made of hand-made porous brick and being wet when the cement is applied, the cement does not set quickly, which greatly adds to the hardening of the cement, and the bricks being porous the cement adheres thereto better than to stone or gravel.

The object of coating the block with coal-tar is to prevent dampness from penetrating into the block, so that the block is less liable to injury by frost.

Having thus described my invention, I claim as new and desire to secure by Letters Patent—

1. A paving-block consisting of a series of bricks grouped to form a rectangle, having the spaces between the said bricks filled with a cement grouting, the top covered with a cement mortar and the sides with a coat of coal-tar, with the exception of the top, substantially as shown and described.

2. A paving-block consisting of a series of porous bricks arranged to form a predetermined shape, and the spaces between the same filled with a cement grouting, and the top of the said bricks covered with a cement mortar, substantially as shown and described.

3. A paving-block consisting of a series of porous bricks arranged to form a predetermined shape, having the spaces between the same filled with a cement grouting, a cement mortar covering the upper faces of the bricks, and the said block being provided with a coat of coal-tar upon all sides with the exception of the top, substantially as shown and described.

R. B. BERRIE.

Witnesses:
   EDWIN T. HILL,
   WILLIAM C. DUNCAN.